(12) United States Patent
Schmidt et al.

(10) Patent No.: US 8,810,802 B2
(45) Date of Patent: Aug. 19, 2014

(54) AUXILIARY DEVICE OF A DRILLING MACHINE AND CONTROL METHOD

(75) Inventors: Peer Schmidt, Lindau (DE); Roland Schaer, Grabs (CH); Alexander Liniger, Zurich (CH); David Leuzinger, Zurich (CH)

(73) Assignee: Hilti Aktiengesellschaft, Schaan (LI)

( * ) Notice: Subject to any disclaimer, the term of this patent is extended or adjusted under 35 U.S.C. 154(b) by 412 days.

(21) Appl. No.: 13/335,669

(22) Filed: Dec. 22, 2011

(65) Prior Publication Data

US 2012/0328381 A1  Dec. 27, 2012

(30) Foreign Application Priority Data

Dec. 23, 2010 (DE) .......................... 10 2010 064 107

(51) Int. Cl.
*G01B 11/14* (2006.01)
(52) U.S. Cl.
USPC ............................ 356/614; 356/620; 356/622
(58) Field of Classification Search
USPC ...................... 356/237.1–241.6, 242.1–243.8, 356/426–431, 600–640
See application file for complete search history.

(56) References Cited

U.S. PATENT DOCUMENTS

| | | | | |
|---|---|---|---|---|
| 3,130,633 A * | 4/1964 | Rantsch | ......................... | 356/144 |
| 4,468,959 A * | 9/1984 | Roberts | ....................... | 73/152.01 |
| 4,968,146 A * | 11/1990 | Heizmann et al. | ............ | 356/623 |
| 5,298,977 A * | 3/1994 | Shintani et al. | ................ | 356/603 |
| 5,351,316 A | 9/1994 | Kakimoto | | |
| 6,478,802 B2 * | 11/2002 | Kienzle et al. | ................. | 606/130 |
| 6,583,869 B1 * | 6/2003 | Sheridan | ........................ | 356/153 |
| 6,587,184 B2 * | 7/2003 | Wursch et al. | ................ | 356/4.01 |
| 7,200,516 B1 * | 4/2007 | Cowley | .......................... | 702/151 |
| 7,992,311 B2 * | 8/2011 | Cerwin | ........................... | 33/286 |

FOREIGN PATENT DOCUMENTS

| | | |
|---|---|---|
| DE | 10 2006 026 156 A1 | 12/2007 |
| DE | 10 2010 003 489 A1 | 10/2010 |
| WO | WO 2007/141081 A1 | 12/2007 |

OTHER PUBLICATIONS

German Search Report, dated Dec. 5, 2011, 4 pages.
European Search Report, dated May 3, 2012, 5 pages total.

* cited by examiner

*Primary Examiner* — Gregory J Toatley
*Assistant Examiner* — Jarreas C Underwood
(74) *Attorney, Agent, or Firm* — Crowell & Moring LLP

(57) ABSTRACT

A drilling apparatus and control method is disclosed. An auxiliary device can be connected to a drilling machine. The auxiliary device includes a camera aligned in a working direction for recording an image of a working surface and a drill hole generated by the drilling machine. An image processing device is provided for identifying the drill hole in the image. Based on a distance from the drill hole to a reference point in the image, an evaluation device determines a distance from the drilling machine to the workpiece. A display device serves to indicate the determined distance.

7 Claims, 4 Drawing Sheets

AUXILIARY DEVICE OF A DRILLING MACHINE AND CONTROL METHOD

This application claims the priority of German Patent Document No. 10 2010 064 107.3, filed Dec. 23, 2010, the disclosure of which is expressly incorporated by reference herein.

BACKGROUND AND SUMMARY OF THE INVENTION

This invention relates to an auxiliary device of a drilling machine for determining a distance from the drilling machine to a workpiece and a related control method.

The auxiliary device according to the invention can be connected to a drilling machine or mounted to the drilling machine on a permanent basis. The auxiliary device may comprise detachable or permanent means for mounting to the drilling machine, e.g., clips, couplings, clamps, screws. The auxiliary device comprises a camera aligned in a working direction for recording an image of a working surface and a drill hole generated by the drilling machine. An image processing device is provided for identifying the drill hole in the image. Based on a virtual distance from the drill hole to a reference point in the image, an evaluation device determines a distance from the drilling machine to the workpiece. A display device serves to indicate the determined distance. The invention takes advantage of the fact that a virtual distance from the drill hole in the image expands to the optical axis or center of the image with diminishing distance. One optical axis of the camera is preferably parallel and staggered to a working axis of the drilling machine.

A control method for determining a distance of a drilling machine from a working surface provides the following steps: recording an image of a working surface including a drill hole generated by the drilling machine, identifying the drill hole in the image, determining a distance from the drilling machine to the workpiece based on a distance from the drill hole to a reference point in the image by an evaluation device, and indicating the determined distance by a display device. The image recognition device can identify a drill in the image. A visible end of the drill pointing to the optical axis may be determined and identified as the drill hole.

One embodiment provides that a projector for emitting a first light beam in a first direction, which generates a first light spot on the working surface, and a second light beam in a second direction, which generates a second light spot on the working surface, is provided, with the first and the second direction being different. The evaluation device is arranged to determine an inclination of the drilling machine to the workpiece based on a first distance of the first light spot recorded in the image to a reference point and a second distance of the second light spot recorded in the image to the reference point. The distance from the drilling machine to the workpiece as determined may also be taken into account to specify the inclination as absolute angles.

The following description explains the invention based on exemplary embodiments and figures.

DETAILED DESCRIPTION OF THE DRAWINGS

Equal elements or elements equal in function are indicated by the same reference symbols in the figures, unless specified otherwise.

Figure 1:
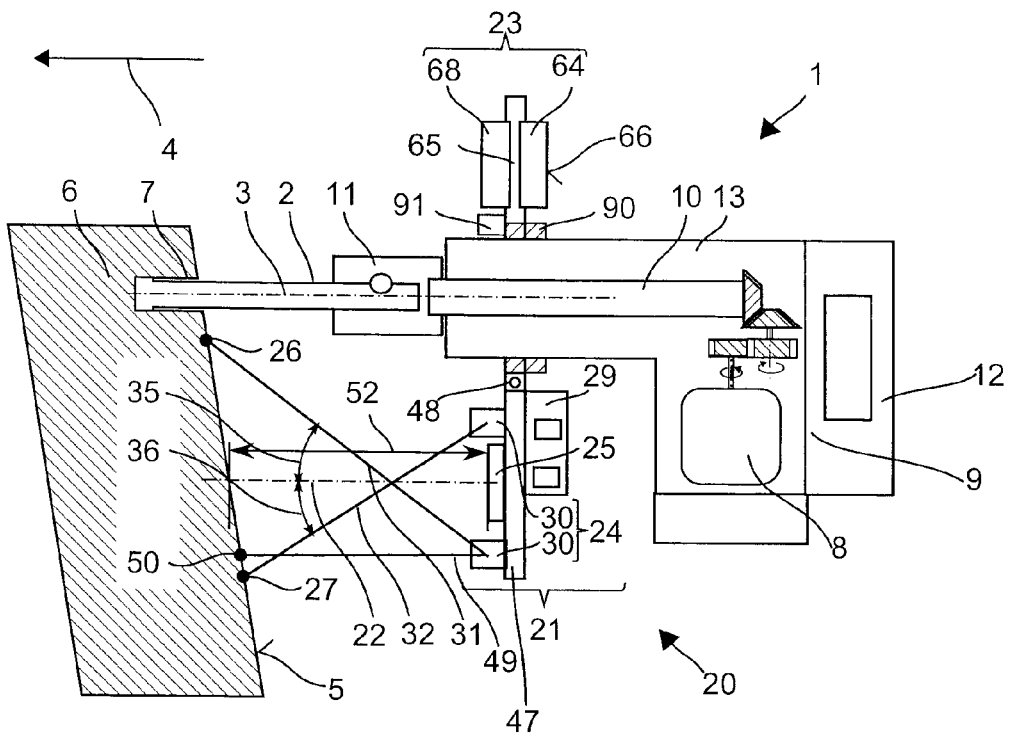
FIG. 1 shows a drilling machine with an auxiliary device.

FIG. 1 shows an exemplary drilling machine 1, which can activate a drill 2 around a working axis 3 in a rotating manner. An operator presses the drill 2 in working direction 4 against a working surface 5 of a workpiece 6 to be machined. In so doing, the rotating drill 2 generates a drill hole 7 in the workpiece 6. The drill 2 comprises a cutting element made of hard metal, e.g., sintered tungsten carbide and/or diamond, which takes material off the workpiece 6 as a result of the rotation around the axis. The drill cuttings may be removed by a helical shaft or a hollow shaft of the drill. The cutting elements may also be arranged along a circular front surface of a cup-shaped drill.

A drive may comprise a motor 8, e.g., an electric motor, a transmission 9 and an output spindle 10. The output spindle 10 transmits a torque to a tool holding device 11, into which the drill 2 can be inserted. By the grip 12 an operator can hold and/or guide the drilling machine 1, which is preferably arranged at one of the ends of a machine housing 13 away from the tool holding device 11.

An auxiliary device 20 makes it easier for the operator to align, and guide in an aligned manner, the working axis 3 of the drilling machine 1 at a desired angle, preferably vertically, to the working surface 5 to be machined. An optical measuring device 21 may determine the orientation of its optical axis 22 relative to the workpiece 6. A display device 23 displays to the operator the current orientation. In addition, the auxiliary device 20 may determine a current drilling depth and display it by the display device 23.

Figure 2:
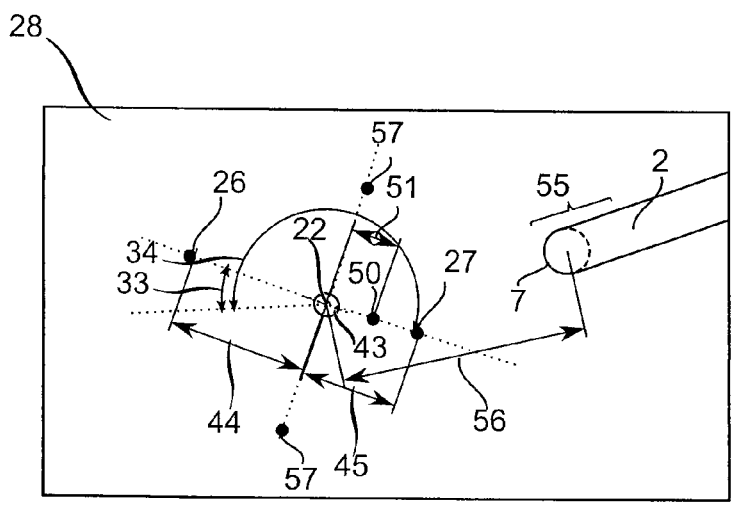
FIG. 2 shows an image taken by the auxiliary device.
Figure 3:
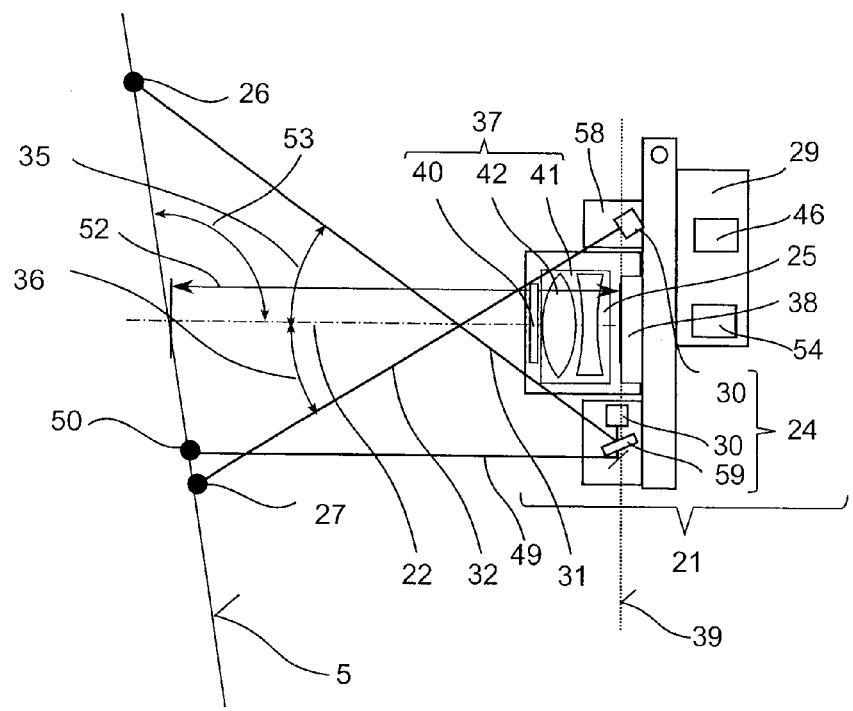
FIG. 3 shows a detail view of an optical measuring device of the auxiliary device.

The optical measuring device 21 of the auxiliary device 20 comprises a projector 24 and a camera 25 illustrated in greater detail in FIG. 3. The projector 24 generates at least one light point 26 and one second light point 27 on the working surface 5. The camera 25 is preferably arranged on the optical axis 22 and records the working surface 5 and the light points 26, 27 generated on it in an image 28 (FIG. 2). Based on the image 28 and the light points 26, 27 recorded therein, an evaluation device 29 determines an orientation of the optical axis 22 relative to the working surface 5.

Two laser light sources 30, e.g., laser diodes, which generate a first light beam 31 and a second light beam 32, are one example of a projector 24. The first light beam 31 is emitted in a first direction 33 and the second light beam 32 in a second direction, which is different from the first direction.

The direction of the light beams 31, 32 is specified below in angular coordinates relative to the optical axis 22. A polar angle describes the inclination of a light beam relative to the optical axis 22 in a plane spanned by the light beam and the optical axis 22.

An azimuth angle indicates the orientation of the light beam in a rotational direction around the optical axis 22 and may be determined in a projection on a plane vertically to the optical axis 22 (cf. FIG. 2).

Preferably, a first azimuth angle 33 of the first light beam 31 and a second azimuth angle 34 of the second light beam 32 differ. The first azimuth angle 33 may differ by 180 degrees from the second azimuth angle 34, i.e., the two light beams 31, 32 are in one plane with the optical axis 22. A first polar angle 35 of the first light beam 31 and a second polar angle 36 of the second light beam 32 may be identical. Preferably, the polar angles 35, 36 range between 10 and 60 degrees. The projector 24 may emit the light beams 31, 32 crossing the optical axis 22.

On the working surface 5 the first light beam 31 leads to the first light point 26 and the second light beam 32 leads to the second light point 27. From the relative position of the first and the second light point to the optical axis 22 and the distances the relative orientation of the optical axis 22 to the workpiece 6 can be determined. The light beams 31, 32 emitted by the projector 24 may comprise a circular cross-section or a different form. Due to their easily determinable position light points having a low diameter are preferred; however, light spots shaped differently, e.g., of a non-circular form, arrows, crosses, may also be projected onto the workpiece 6.

The camera 25 records the working surface 5 with the light points 26, 27 on the workpiece 6. The camera 25 may comprise imaging optics 37, which images the working surface 5 onto a photo sensor 38 with spatial resolution. The photo sensor 38 converts the incident light it receives into an image 28, which, spatially resolved, indicates an intensity of the light in an image plane 39. Advantageously, the light points 26, 27 are so bright that they show the highest intensity when imaged in the image 28. A color filter 40 adjusted to the color of the light points 26, 27 may be arranged in front of the photo sensor 38 to increase contrast.

The imaging optics 37 may include an objective 41 comprised of one or several lenses 42. Preferably, the lenses 42 are arranged in center and vertically to the optical axis 22. Instead of, or in addition to the objective 41 an aperture may also be provided. The projector 24 and the camera 25 are staggered relative to one another, such that the first light point 26 is captured by the camera 25 under a direction different from the first direction and the second light point 27 is captured under a direction different from the second direction.

An evaluation device 29 reads out from the camera 25, especially from the photo sensor 38 with spatial resolution, the image 28. The brightest points of the image are interpreted as the virtual, imaged light points 26, 27. The position of the imaged light points 26, 27 relative to a reference point 43 in the image 28 or in the image plane 39 is determined by the evaluation device 29. In the image 28 a first distance 44 of the first light point 26 to the reference point 43 and a second distance 45 of the second light point 27 to the reference point 43 are determined. The distances measured are virtual. Measuring may include determining the coordinates of the light points 26, 27 in the image. To determine the distances 44, 45, distances associated with the coordinates, for example, are filed in a look-up table on a memory device 46, e.g. RAM, Flash-RAM, of the evaluation device 29. The reference point 43 may be determined at random; preferably, the reference point 43 is the intersecting point of the image plane 39 with the optical axis 22 or a center of the image 28.

An operational mode of the auxiliary device 20 provides for the support of the operator in the vertical orientation of the drilling machine 1 relative to the workpiece 6. The auxiliary device 20 is mounted to the drilling machine 1 such that the optical axis 22 is parallel to the working axis 3. The evaluation device 29 transmits a control signal, which indicates the optical axis 22 as being tilted relative to the workpiece 6, when the first distance 44 is different from the second distance 45. The control signal indicates the direction of the larger of the distances 44, 45. The display device 23 displays the control signal to the operator. For example, the display device 23 shows an arrow pointing into the direction. This instructs the operator to pivot the grip 12 in the direction around the drill hole until the distances 44, 45 are equal and the optical axis 22 is vertical to the workpiece 6.

The optical measuring device 21 may be arranged on a pivotable platform 47 opposite the working axis 3. Especially, a polar angle between the optical axis 22 and the working axis 3 can be adjusted. The platform may, for example, be attached to the mounting of the drilling machine 1 by a ball joint 48 or a swivel joint. An operator sets a desired, for example, non-parallel orientation of the optical axis 22 relative to the working axis 3. The evaluation device 29 and the display device 23 instruct the operator to guide the drilling machine 1 with the optical axis 22 vertically to the workpiece 6.

A drilled drill hole subsequently has an inclination relative to the working surface 5, which corresponds to the set orientation of the working axis 3 relative to the optical axis 22.

In a further operating mode the auxiliary device 20 may determine the angle of the optical axis 22 to the working surface 5 in absolute terms. The projector 24 generates a third light beam 49, preferably parallel to the optical axis 22 and staggered to the optical axis 22. Instead of parallel, the third light beam 49—compared to the first light beam 31—may also show a low polar angle relative to the optical axis 22, e.g., between 0 and 5 degrees. A resulting third light point 50 is captured by the camera 25. A virtual, third distance 51 of the imaged light point 50 from the reference point 43 is determined in the image 28. Based on the third distance 51 a distance 52 of the camera 25 from the workpiece 6 is determined. The third distance 51 increases in the image 28 with decreasing distance 52. Based on the distance 52, the first distance 44 and the second distance 45 and the polar angle 35 of the first light beam 31 and the polar angle 36 of the second light beam 32, the inclination 53 of the optical axis 22 relative to the working surface 5 can be determined absolutely and quantifiably. Preferably, corresponding polar angles 35 were stored in the memory device 46 about different distances 52, first and second distances. Preferably, the display device 23 shows the absolute angle as numbers.

A further embodiment provides that the first light beam 31 and the second light beam 32 show different polar angles 35, 36 relative to the optical axis 22. The two light beams 31, 32 may run within one plane, which, for example, includes the optical axis 22. Preferably, the first light beam 31 is parallel to the optical axis 22, the second light beam is tilted relative to the optical axis 22. By means of the optical axis 22 as a reference point 43, the absolute inclination 53 of the optical axis 22 relative to the working surface 5 can be determined from the first distance 44 and the second distance 45 in absolute terms.

The photo sensor 38 may comprise a plurality of photosensitive cells, which have been arranged on a grid. Coordinates of a light point correspond to the line and, if applicable, to the column of the cell in each case illuminated by the light point 26, 27. A cell may be determined as the reference point 43. The photo sensor 38 may, for example, comprise a CCD-chip or an APS sensor.

In image 28 the camera 25 may record the drill hole 7 in the working surface 5 and the drill 2. The evaluation device 29 comprises an optical recognition 54, which identifies the drill hole 7 and determines its coordinates in the image 28. The optical recognition 54 may, for example, initially identify the drill 2, e.g., based on its oblong shape and/or based on a familiar orientation of the drill 2 in image 28, which results due to its fixed or familiar arrangement of the camera 25 relative to the drill 2. The coordinates of one end 55 of the visible portion of the drill 2 correspond to the coordinates of the drill hole 7. In the image 28 a distance 56 of the drill hole 7 from the reference point 43 is determined. The distance 56 is a measurement for the distance 52 between the camera 25 and the drill hole 7 and thus from the working surface 5. The evaluation device 29 may determine a distance of the drilling machine 1 based on the measurement and transmit it to the display device 23 for visualization. The distance 52 may also be used to determine the absolute angle 53.

The embodiments described thus far may determine an inclination in deviation from a plumb-line or as an absolute angle 53 of the optical axis 22 relative to the workpiece 6 in a first plane. A further development provides for additional light beams, which show azimuth angles that differ from the first and the second light beam 31, 32 by 90 degrees. The light points 57 of the additional light beams may be evaluated analogous to the first and second light beam 31, 32. This determines the inclination in a second plane relative to the first vertical plane. To determine the absolute angles 53, the third light beam 49 may also be used, which, relative to the optical axis 22, has a polar angle different from the other light beams 31, 32. One embodiment provides for three light beams with different orientations, two of which differ at least in terms of their azimuth angle, and two differ at least with respect to their polar angle. In addition, or instead of the third light beam 49, a measurement of the distance 56 of the drill hole 7 from the optical axis 22 in the image 28 may be used to determine the distance.

The projector 24 may be composed of several individual, independent laser light sources 30. The laser diodes 30 may be arranged in a housing 58, aligned according to the predetermined directions of the laser beams 32. The projector 24 may also comprise a beam splitter 59 to split one light beam in two light beams 31, 49. The beam splitter 59 may, for example, comprise a small glass plate or a bundle of glass fibers.

Figure 4:
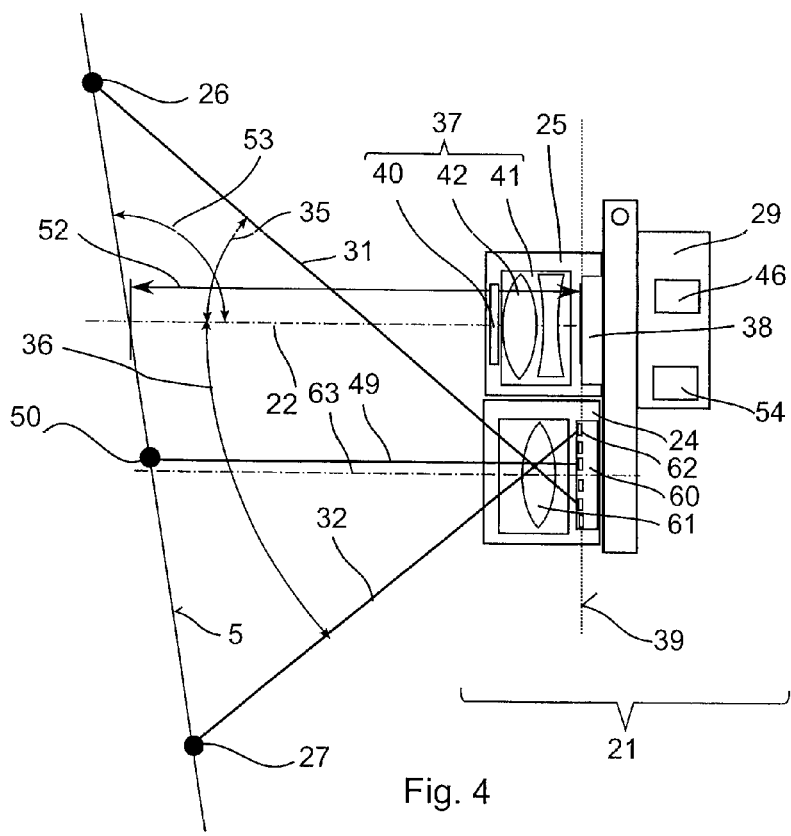
FIG. 4 shows a detail view of an optical measuring device of the auxiliary device.

In another embodiment the projector 24 comprises a self-luminous monitor 60 and new imaging optics 61 (FIG. 4). The monitor 60 may, for example, be a backlit liquid crystal display, a matrix made of light-emitting diodes, etc. Symbols composed of several image points 62 may be shown on the monitor 60. The imaging optics 61 images the image shown on the monitor 60 on the working surface 5. The imaging optics 61 may comprise one or several lenses arranged along an optical axis 63 of the imaging optics 61. The optical axis 63 runs through the monitor 60, preferably through the center of the monitor 60. Image points near the optical axis 63 lead to light beams largely parallel to the optical axis 22, while image points near the edge of the monitor are projected onto the working surface 5 by light beams 31, 32 inclined to the optical axis 63. The inclination of the light beams may be adjusted by the focal width of the imaging optics 61.

Figure 5:
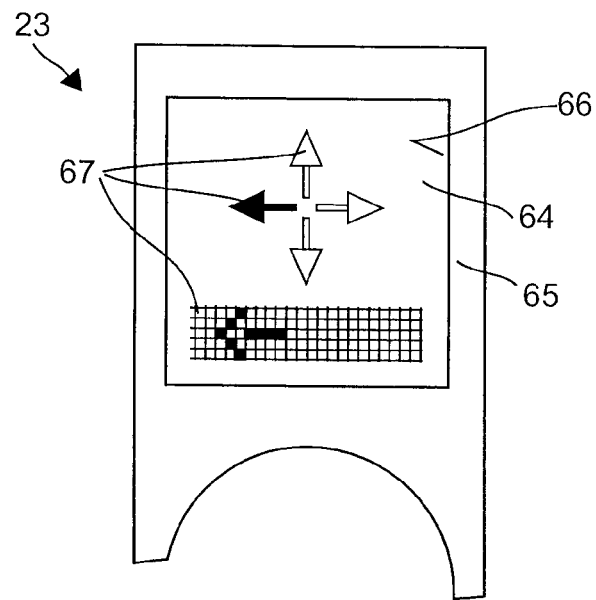
FIG. 5 shows a monitor of a display device of the auxiliary device.

The display device 23 comprises a monitor 64 mounted to a bracket 65 of the auxiliary device 20. The readable surface 66 of the monitor 64 is turned to the operator, i.e., oriented away from the working direction 4. When guiding the drilling machine 1 in working direction 4, the operator can read information from the monitor 64. Several electro-optical segments 67 can be switched between a bright and a dark state independent of one another (FIG. 5). The segments 67 may be self-luminous, e.g., a line or a matrix comprised of light diodes, or shading background illumination, e.g., several liquid crystal cells. The segments 67 may be embodied in the form of arrows aligned to be rotated in 90 degree intervals. If the optical axis 22 is tilted relative to the working surface 5, one of the segments 67, in each case, is activated in accordance with the control signal of the evaluation device 29. The segments 67 may also be embodied as a multitude of image points on a grid, which, if activated together, show arrows, numbers, letters, etc. The example of FIG. 5 shows a group of blanked segments 67, which indicate an inclination to the right, and therefore prompt the operator to tilt the drilling machine 1 to the left. The segments 67 are arranged on a surface of the auxiliary device 20 facing away from the tool 2. The operator can read out the directions shown directly from the auxiliary device 20.

Figure 6:
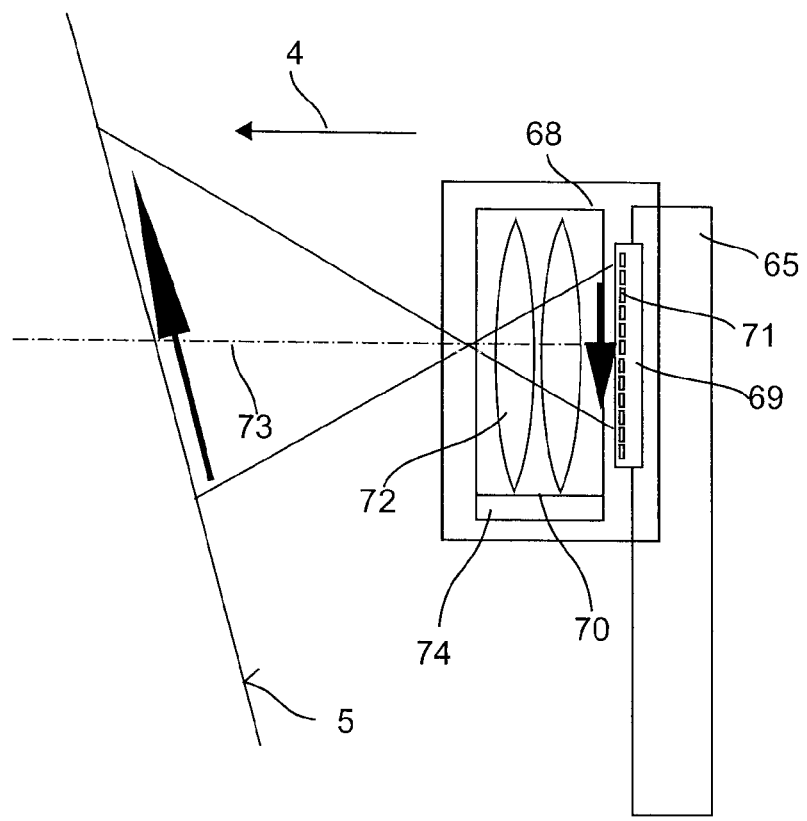
FIG. 6 shows a projector of a display device of the auxiliary device.
Figure 7:
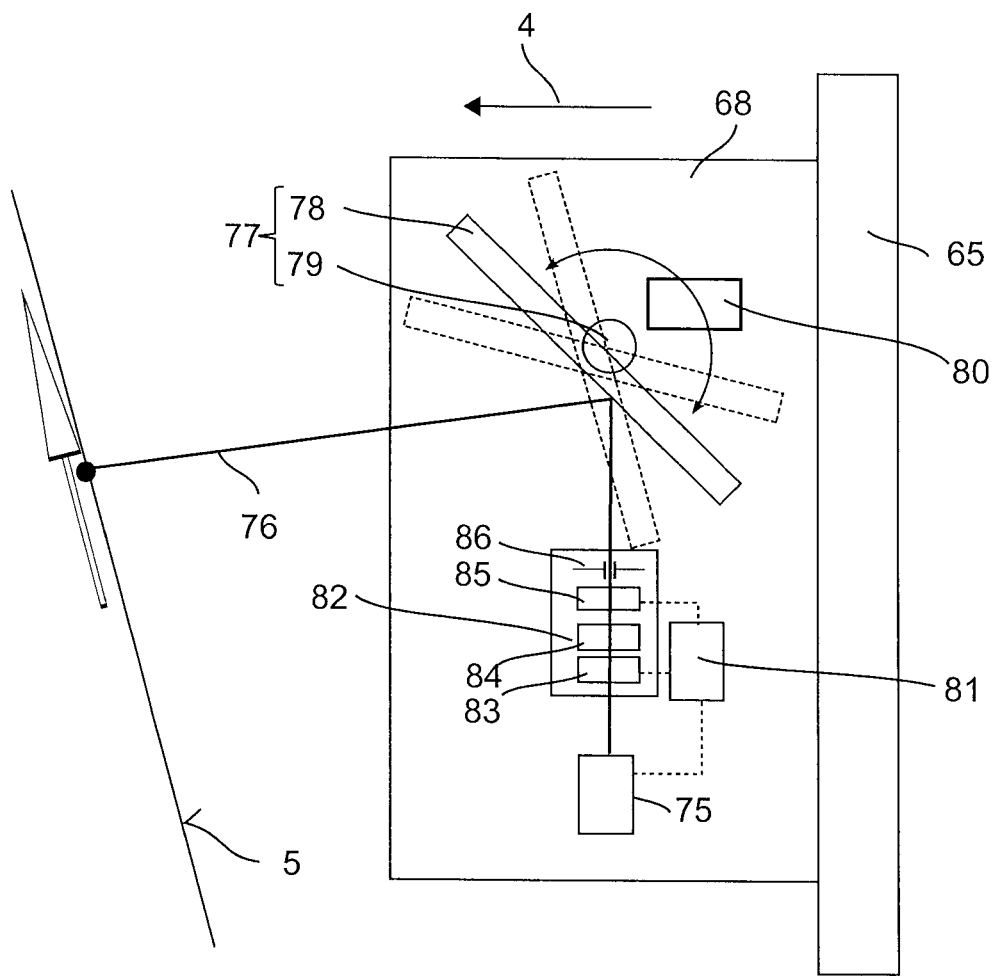
FIG. 7 shows a projector of a display device of the auxiliary device.

The display device 23 comprises, for example, a projector 68, which projects information to be shown by the display device 23 onto the working surface 5 (FIG. 6). The projector 68 faces in working direction 4. The projector 68 may comprise a self-luminous monitor 69 and an imaging optics 70.

The monitor 69 is comprised of several electro-optical luminous elements 71 that can be actuated individually. Each of the electro-optical elements 71 may emit light in one switching status and emit no light in a different switching status. The electro-optical elements 71 may, for example, comprise backlit liquid crystal displays, point-shaped or geometrically differently shaped light-emitting diodes, a field of micro-mirrors illuminated by a lamp, etc. As an example, the monitor 69 is shown with several electro-optical elements 71 arranged on a grid. The image points may illuminate individually or in groups in order to display one or several desired symbols. The symbols are arrows, numbers, letters, etc. The measuring device 21 actuates the projector 68. In this process, depending on the data transmitted by the measuring device 21, different groups of the electro-optical elements 71 can be illuminated. In pairs, the groups differ at least with respect to one element 71, which is switched on for the one group and switched off for the other group.

The imaging optics 70 images the symbols displayed on the monitor 69 onto the working surface 5. The imaging optics 70 comprises an objective 72 made up of one or several lenses. The focal width and one focal point of the objective 72 may be adjustable. For example, the objective 72 may be moved along an optical axis 73 by a sliding carriage 74. Alternatively, the objective 72 may comprise a liquid lens, whose focal width is adjustable by applying an electric field.

Another embodiment of the projector 68 comprises a light source 75 to generate a light beam 76, preferably a laser, and a deflection device 77. The deflection device 77 comprises, for example, a mirror 78, which is mounted so as to be rotatable or pivotable around two axes 79. The mirror 78 may be activated by an exciter 80, for example piezoelectrically, magnetically or electrostatically, to pivot around the two axes 79. The mirror 78 may also rotate around one or two axes 79. To deflect the light beam 76 in two directions, two pivotable or rotating mirrors may also be provided. The light beam 76 is deflected along a grid, for example, a Lissajous figure over the working surface 5.

An activation device 81 applies an intensity to the light beam 76 depending on the position of the deflection device 77 to project symbols onto the working surface 5. A circuit pattern may be deposited in a memory device of the activation device 81 for various necessary symbols, e.g., arrows, numbers. The circuit patterns determine the intensity relative to an angular position of the mirror 78. The intensity of the light beam 76 is reduced as soon as the light beam 76 is outside the areas of the symbol. The intensity may be applied by activating a power supply for the light source 75 by the activation device 81. Activation may further take place by an intensity modulator 82, which, for example, comprises a combination of a pockels cell 83 to change a polarization and a downstream polarization filter 84 and/or a combination of an acousto-optic modulator 85 to change a propagation direction of the light beam and a downstream aperture 86.

One embodiment provides to use the projector 68 of the display device 23 for the display of measurement results also to generate the light spots 26, 27 on the working surface 5 for the measuring device 21 to take measurements. An additional projector 24 of the measuring device 21 may be omitted.

The auxiliary device 20 may comprise a tension strip 90, which may be placed around a neck or a grip of the drilling machine 1. A gripping mechanism 91 clamps the tension strip to the drilling machine 1. Instead of a tension strip, clips can also be clamped to the drilling machine 1 by the gripping mechanism 91.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drilling apparatus, comprising:
    a drilling machine; and
    an auxiliary device coupled to the drilling machine, wherein the auxiliary device includes:
        a camera directed in a working direction of the drilling machine, wherein an image of a working surface of a workpiece and a drill hole generatable by the drilling machine is recordable by the camera;
        an image processing device, wherein a drill hole in an image recorded by the camera is identifiable by the image processing device;
        an evaluation device, wherein a distance from the drilling machine to the workpiece is determinable by the evaluation device based on a distance from a drill hole to a reference point in an image recorded by the camera; and
        a display device, wherein the distance from the drilling machine to the workpiece is displayable by the display device.

2. The drilling apparatus according to claim 1, further comprising a projector, wherein:
    a first light beam is emittable by the projector and wherein a first light spot is generatable on the working surface by the first light beam;
    a second light beam is emittable by the projector and wherein a second light spot is generatable on the working surface by the second light beam; and
    a third light beam is emittable by the projector and wherein a third light spot is generatable on the working surface by the third light beam;
    wherein the first, second, and third light beams are emittable with orientations such that an azimuth angle of the first light beam related to an optical axis of the camera is different from an azimuth angle of the second light beam related to the optical axis of the camera, and such that a polar angle of the first light beam related to the optical axis is different from a polar angle of the third light beam related to the optical axis.

3. The drilling apparatus according to claim 2:
    wherein the first light spot and the second light spot are recordable by the camera in an image;
    wherein an inclination of the drilling machine to the workpiece is determinable by the evaluation device based on a first distance of the first light spot in the image to a reference point and a second distance of the second light spot in the image to the reference point;
    and wherein the inclination is displayable by the display device.

4. The drilling apparatus according to claim 1, wherein an optical axis of the camera is parallel and staggered to a working axis of the drilling machine.

5. A control method for determining a distance of a drilling machine from a workpiece, comprising the steps of:
    recording an image of a working surface of the workpiece and a drill hole in the working surface generated by the drilling machine;
    identifying the drill hole in the image;
    determining a distance of the drilling machine to the workpiece based on a distance of the drill hole to a reference point in the image by an evaluation device; and
    displaying the determined distance by a display device.

6. The control method according to claim 5, further comprising the steps of identifying a drill in the image and indentifying a visible end of the drill pointing to an optical axis as the drill hole.

7. The control method according to claim 5, further comprising the steps of:
    emitting a first light beam in a first direction to generate a first light spot;
    emitting a second light beam in a second direction to generate a second light spot, wherein the first direction is different from the second direction;
    recording the first light spot and the second light spot in the image;
    determining a first distance of the first light spot recorded in the image to the reference point and a second distance of the second light spot recorded in the image to the reference point; and
    determining an inclination of the drilling machine relative to the working surface by the evaluation device based on the first distance and the second distance.

* * * * *